June 9, 1936.    J. E. BREUER    2,043,827
DECOY
Filed Feb. 25, 1935
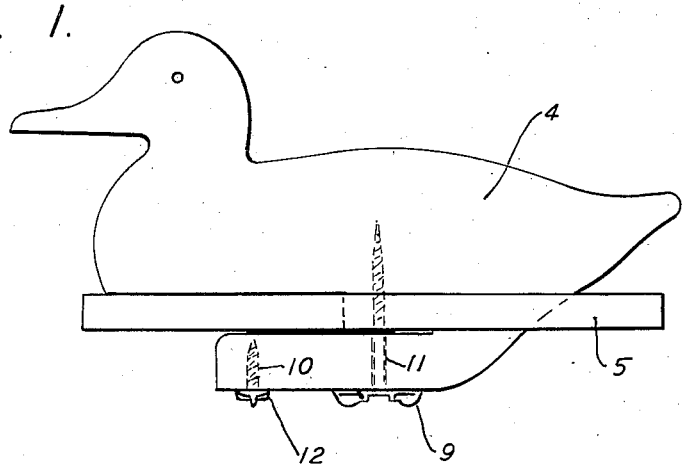
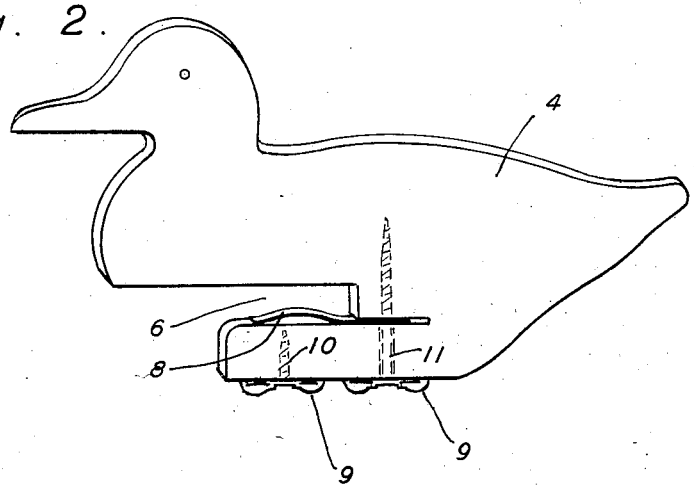
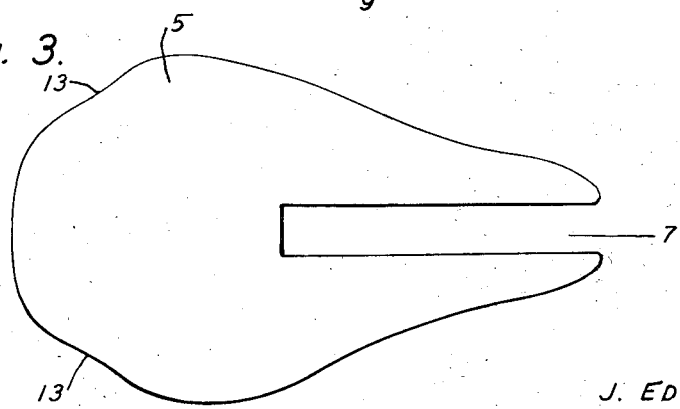
INVENTOR
J. EDWARD BREUER
BY
ATTORNEYS.

Patented June 9, 1936

2,043,827

UNITED STATES PATENT OFFICE 2,043,827

DECOY

John Edward Breuer, Great Neck, N. Y., assignor to J. Edward Breuer, Inc., Nassau County, N. Y., a corporation of New York Application February 25, 1935, Serial No. 7,972

4 Claims. (Cl. 43—3)

My invention relates to a new and improved form of decoy used for hunting ducks, geese, etc. known as the shadow type of decoy consisting of a float and upright decoy member secured thereto.

An object of the invention is to provide a device which can be readily taken apart and packed in small compass.

Another object of the invention is to have a device with a minimum number of parts, simple means of adjustment and which can be readily manipulated in cold weather without danger of the various parts being congealed with ice, etc.

A number of efforts have been made to accomplish this result, but none of them has been satisfactory from a practical standpoint. They all contain a complicated arrangement of latches, wires, weights, etc., which make them difficult of manipulation.

Another object of the invention is to form the bottom or float member in such a way that it will not capsize in heavy weather.

Another object of the invention is to provide means for the device to be placed upright either on ice or on the ground near the shores of a river, lake or bay or other places where it is desired to be used.

An embodiment of the invention is illustrated in the accompanying drawing wherein:

Fig. 1 is a side elevation of the device simulating the appearance of a duck.

Fig. 2 is an illustration of the upright portion of the device.

Fig. 3 is a plan view of the float or horizontal base of the device.

The device is made of two flat members either of wood about ⅞ths of an inch thick or, if desired, it may be made of metal.

It comprises an upright or decoy member 4 and a horizontal or float member 5. The member 4 has a recess or slot 6 and the flat member 5 has a recess or slot 7. The bottom part of the member 4 acts as a keel to minimize the danger of capsizing and the keel may be made of any desired depth. It may be made in the proportion shown in Fig. 2 or it may be made of any desired depth. At the bottom portion of slot 6 in the upright member 4 is secured a resilient spring member 8, preferably made flat and of some non-corrodible material such as stainless steel or bronzed steel, which will not rust by the action of water.

When the member 4 is inserted into the slot 7 of the member 5, the spring member holds the upright member firmly in position and, at the same time, allows ready withdrawal of the same for the purpose of taking the two members apart.

To the bottom or what may be termed the keel member of portion 4 are secured latches 9 which may be turned on the securing screws 10 and 11 in order to secure a fish-line or other line to anchor the device.

The screw 11 is of sufficient length to pass from the bottom of the member 4 far enough into the member 4 to prevent the lower part of said member 4, which is naturally weakened when the device is made of wood, by the slot 6, from splitting off. The latches 9 may be turned laterally so as to be cross-wise of the device, as shown at 12 in Fig. 1. When both the latches 9 are turned in a cross-wise position, the device will stand upright on the ice or on the ground if desired.

While the spring-holding member 8 is shown in Fig. 2 as being on the upright member 4, it will be understood that, if desired, it can be placed on the float member 5 adjacent the slot 7. The lower or float member 5 has near the front or large end thereof slight recesses 13 formed in the outline of the float member. I have found by experimentation that this indented portion 13 on each side of the float member 5 has a very marked stabilizing effect and tends to prevent capsizing of the device in rough water. On the other hand, if the flat member has an unindented, curved line, the device will capsize very readily in rough water.

The operation of the device is as follows:

The upright member 4 is slid into the float member 5 by means of the slots or recesses 6 and 7. The spring 8, whether placed on the free member or the float member, serves to frictionally hold the two members together. A line is fastened to either the front or rear latch member 9 shown in Fig. 2 and this line may be secured to an anchor when the decoy is to be left in the water for any length of time, or the line may run into the boat and, if desired, a hunter can have any required number of decoys fastened to a line leading to a boat secured in a blind. In that case, when it is desired to pull in the decoys, they can be pulled very readily into the boat. They can then be taken apart by simply pulling the member 4 away from the member 5. The two members can then be laid flat, one upon the other and packed in a very small space as there are no protuberances extending from either member.

While I have shown the device in the form of a duck, it will be understood that it can be made to represent various other kinds of birds. Of course, the colors and decorations of the various kinds of birds may be applied as desired.

I claim:

1. A decoy comprising a flat upright member and a flat float member, the enlarged portion of the float member having slight indentations on each side thereof and near the front, a spring member for frictionally holding the members together and adjustable members on the bottom of the upright member whereby the adjustable members can be turned to hold the device in an upright position when used on land or ice.

2. A decoy comprising an upright or figure member, a flat base or float member, means in each member for sliding one member into the other, spring held frictional contacting means for holding the members together, adjustable members for attaching a line and to enable the device to stand upright when out of water.

3. A decoy, comprising an upright member and a float member, each of said members having a recess adapted to engage a portion of the other of said members, whereby said members may be interlocked in assembled position, one of said members having a slot forming a continuation of the recess therein and a flat spring seated in said slot and extending into said recess, said spring being adapted to engage the other of said members for frictionally and detachably holding the same in assembled position, and securing means extending through said slot and through the portion of the spring therein for securing the spring and for strengthening the member.

4. A decoy, comprising an upright member and a float member, each of said members having a recess adapted to engage a portion of the other of said members, whereby said members may be interlocked in assembled position, one of said members having a slot forming a continuation of the recess therein and a flat spring seated in said slot and extending into said recess, said spring being adapted to engage the other of said members for frictionally and detachably holding the same in assembled position.

J. EDWARD BREUER.